No. 763,481.   Patented June 28, 190(

UNITED STATES PATENT OFFICE.

OLIVER D. GOODELL, OF BALTIMORE, MARYLAND.

INSECTICIDE COMPOUND.

SPECIFICATION forming part of Letters Patent No. 763,481, dated June 28, 1904.

Application filed July 26, 1897. Serial No. 645,940. (No specimens.)

*To all whom it may concern:*

Be it known that I, OLIVER D. GOODELL, of the city of Baltimore, in the State of Maryland, have invented certain new and useful Improvements in Insecticide and Germicide Compounds; and I do hereby declare that the following is a full, clear, and exact description thereof.

The object of my invention has been to provide an improved compound for killing insects and their larvæ; and to this end my invention consists in the compound as hereinafter specified.

While my compound is especially intended for the destruction of insects and the larvæ thereof which infest plants and trees, I desire it to be understood that such compound is also of use for destroying parasitic growths other than animal, and the germs of such growths, and insects other than those which infest trees and plants.

My compound, which is in powder form and can be used either directly in such form or can be dissolved in water, so as to be sprayed in solution upon the plants, trees, or other surfaces and the insects, larvæ, or parasitic growths thereon, consists of sulfid of barium, silicate of barium, oxid of barium, silicate of potassium, sulfid of potassium, and oxid of potassium. It also usually contains carbon, silex, and sulfid of iron; but such substances are not essential to its good action as an insecticide and germicide and can be left out or dispensed with without involving any departure from my invention.

The proportions which I prefer for the various ingredients of my compound are sulfid of barium, seventy-five per cent.; silicate of barium, two per cent.; oxid of barium, one per cent.; silicate of potassium, three per cent.; oxid of potassium, three per cent., and sulfid of potassium one per cent. Where the carbon, silex, and sulfid of iron are present, there is usually of the carbon ten per cent., of the silex three per cent., and of the sulfid of iron two per cent.

While the relative proportions above given are as I prefer them, I desire it to be understood that they can be varied to a considerable extent without departure from my invention.

When the compound described above is used in powder form and is dusted on plants, trees, or other objects, it will wherever it comes in contact with insects or the larvæ thereof or the germs of parasitic growths kill the same, and wherever the insects, larvæ, or parasitic growths are not present at the time of dusting it will act as a deterrent in keeping them away from the surfaces which are so dusted. When used in solution and sprayed on the vegetable or other surfaces to be freed from or protected from insects, larvæ, or the germs of parasitic growths, it also acts as a strong insecticide and germicide and powerful deterrent to the subsequent infesting of such surfaces by the insects, larvæ, or other parasitic growths. When used in either form, whether in powder or solution, my compound has no deleterious effect on the leaves or stalks of vegetation and does not injure the same as arsenical compounds usually do, nor does my compound interfere with or hinder the growth of vegetation, but from actual practice it has been found to materially improve the same. This I consider to be mostly due to the presence of the soluble silicates and also of the sulfur, which when the compound is wet, as by rain or dew, is set free. When it reaches the ground from the vegetation or is dusted or sprayed directly upon the soil and mixed therewith, it serves to destroy the larvæ and germs of insects and parasitic growths which may be in the soil and gives up silex from its silicates and some of its sulfur to the improvement of the growth of vegetation in such soil. The oxid of potassium when mixed with the damp soil becomes hydrate of potassium, which is also beneficial to the soil for plant growth.

Having thus described my invention, what I claim is—

1. An improved insecticide and germicide compound, containing sulfid of barium, silicate of barium, silicate of potassium, oxid of potassium and oxid of barium, substantially as and for the purpose described.

2. An improved insecticide and germicide compound, containing sulfid of barium, silicate of barium, silicate of potassium, oxid of potassium, oxid of barium, sulfid of iron, silex, and carbon, substantially as and for the purpose described.

3. An improved insecticide and germicide compound containing sulfid of barium, silicate of barium, silicate of potassium, oxid of potassium and oxid of barium, there being more sulfid of barium than of the other ingredients, substantially as and for the purpose described.

In testimony that I claim the foregoing I have hereunto set my hand this 21st day of July, A. D. 1897.

OLIVER D. GOODELL

Witnesses:
HENRY C. HAZARD,
H. R. HOWENSTEIN.